United States Patent

Denz et al.

[19]

[11] Patent Number: 6,107,695
[45] Date of Patent: Aug. 22, 2000

[54] DRIVE-AWAY BLOCKING DEVICE

[75] Inventors: Helmut Denz, Stuttgart; Johannes-Dieter Wichterich, Muehlacker; Klaus Walter, Bietigheim-Bissingen; Frank Kohler, Achern; Wilfried Burger, Hemmingen; Bernd Diebold, Rheinau, all of Germany

[73] Assignee: Robert Bosch GmbH, Stuttgart, Germany

[21] Appl. No.: 08/973,234

[22] PCT Filed: May 30, 1996

[86] PCT No.: PCT/DE96/00942

§ 371 Date: Dec. 3, 1997

§ 102(e) Date: Dec. 3, 1997

[87] PCT Pub. No.: WO96/39317

PCT Pub. Date: Dec. 12, 1996

[30] Foreign Application Priority Data

Jun. 3, 1995 [DE] Germany ............ 195 20 505

[51] Int. Cl.[7] .................................................. B60R 25/04
[52] U.S. Cl. .......................................... 307/10.5; 180/287
[58] Field of Search .................................... 307/10.1–10.6; 180/287; 340/425.5, 426, 825.3–825.32, 825.34, 825.44, 825.69, 825.72

[56] References Cited

U.S. PATENT DOCUMENTS 5,561,332  10/1996  Udo et al. .............................. 307/10.5
5,708,307  1/1998  Iijima et al. ........................... 307/10.5

FOREIGN PATENT DOCUMENTS 0642959  3/1995  European Pat. Off. .
4416644  11/1994  Germany .

*Primary Examiner*—Richard T. Elms
*Attorney, Agent, or Firm*—Kenyon & Kenyon

[57] ABSTRACT

A drive lock includes a security control unit and an engine control unit that is ready for operation only when the engine control unit has received from the security control unit an encoded release code that matches a predetermined reference code. The engine control unit has storage devices into which it can enter a reference code. On receipt of a release code, it checks on whether a reference code is present in the storage devices. If there is a reference code matching the release code, the engine control unit makes itself ready for operation. If there is no reference code, it accepts the release code into the storage devices as the reference code.

15 Claims, 4 Drawing Sheets

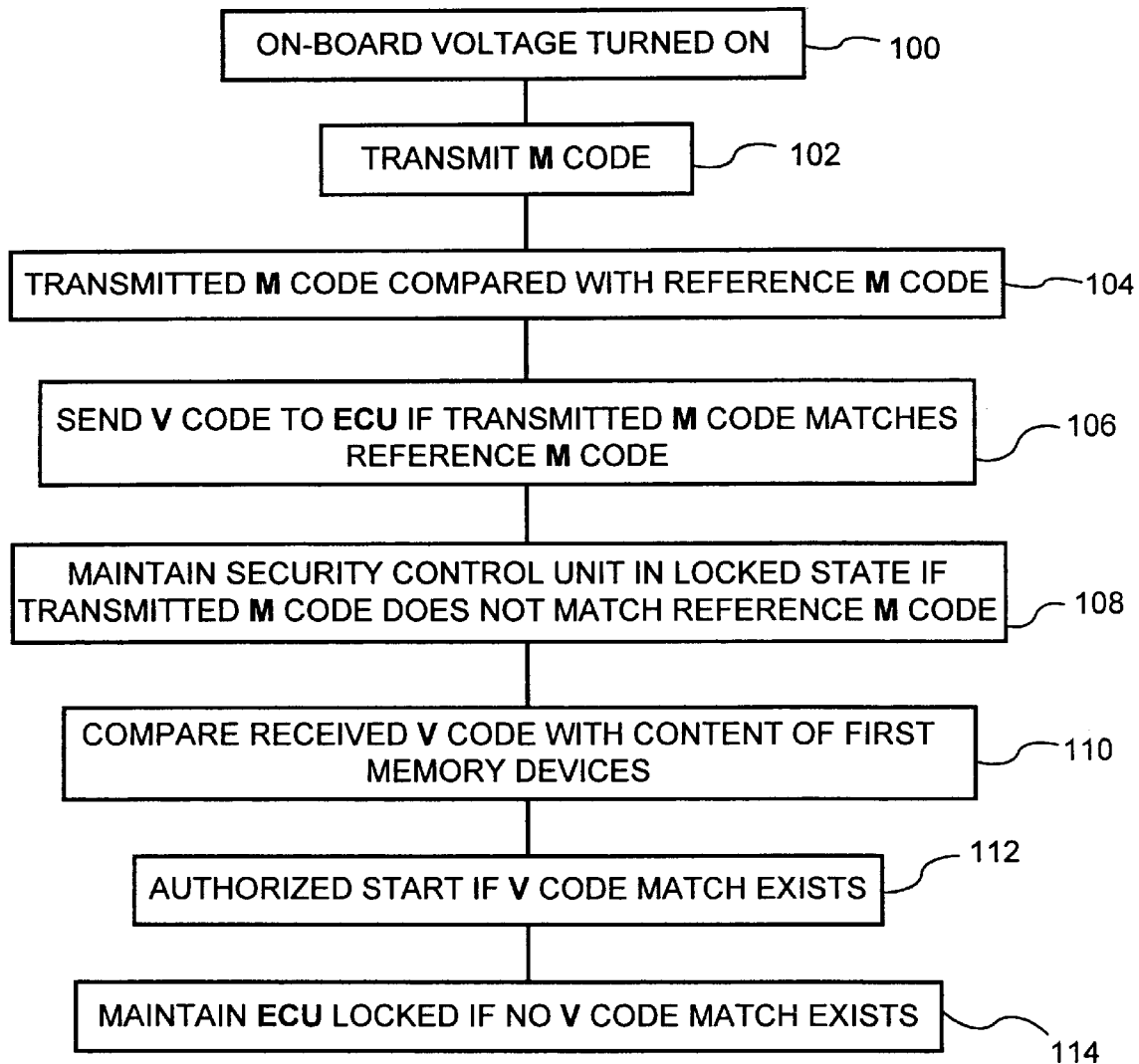
F I G. 2

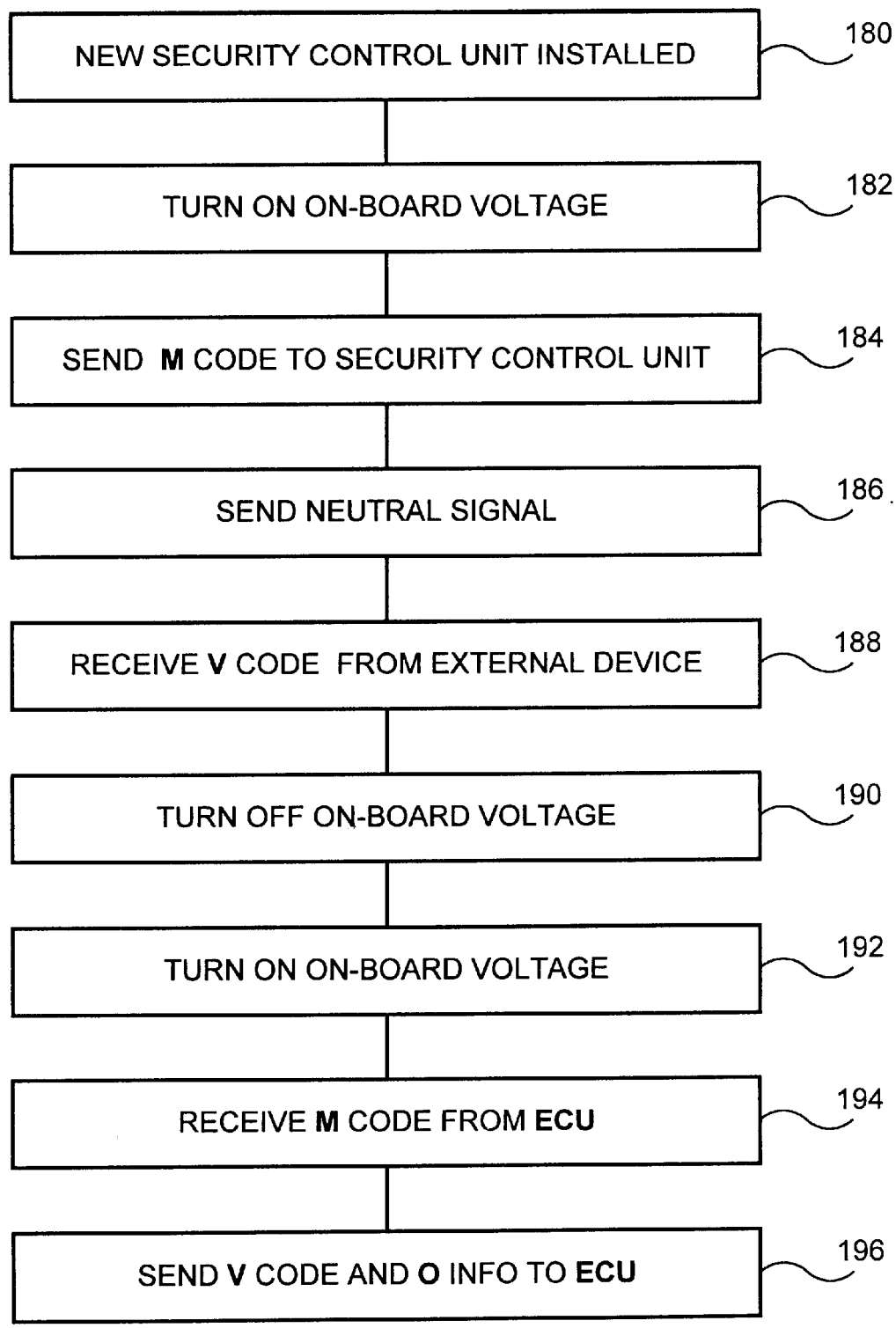
F I G. 4

DRIVE-AWAY BLOCKING DEVICE

FIELD OF THE INVENTION

The present invention relates to a drive lock.

BACKGROUND INFORMATION

A conventional drive lock is described in European Patent Application No. 0 642 959. The arrangement derived from such drive lock includes, among other things, an immobilizer which is connected by a data line to an engine control unit. The immobilizer releases the engine control unit for operation only when the immobilizer has received previously determined code signals, and the latter match a stored reference code. Thus, operation of such a vehicle requires a knowledge of the reference code to be entered into the immobilizer. This makes unauthorized operation of the vehicle much more difficult. With some effort it is nevertheless possible to start the vehicle, specifically by replacing the immobilizer by a corresponding unsecured device. To overcome this disadvantage, German Patent Application No. 44 16 644.2 describes corresponding a start of the engine to an exchange of release data between the immobilizer and the engine control unit. In this process, one of the participating devices sends the other a basic code, which it recodes and sends back. At the same time, the sending device generates a recoded code from the basic code in the same way as the receiving device. A release code is generated when the recoded code received back by the receiving device matches the code generated by the transmitting device. With this conventional arrangement, unauthorized starting is impossible even when one of the participating devices is replaced by an unsecured device. However, authorized handling of this arrangement is also made difficult, for example, when one of the devices involved is defective and is to be replaced. Then the used recoding rule must first be determined, but this may take some effort, depending on the system design.

Therefore, the object of the present invention is to provide a drive lock which cannot be bypassed by replacing one of the participating devices and which permits simple handling.

SUMMARY OF THE INVENTION

This object is achieved with a drive lock according to the present invention. Since the engine control unit is ready for operation only when it has received from the security protective (control) device a reference signal that was previously established according to the present invention by the security protective (control) device, it is impossible to start the respective vehicle if either the engine control unit or the security control unit has been replaced. However, it is comparatively easy for an authorized person to replace one of the units involved if necessary because essentially any unit can be adapted to another. Additionally, the drive lock according to the present invention permits immediate testing of the individual components directly after manufacture. In a further embodiment of the drive lock according to the present invention, emergency unlocking of the engine control unit is possible by direct entries by the user into the engine control unit.

BRIEF DESCRIPTION OF THE DRAWINGS

FIG. 2 shows a first flow chart illustrating an operation of the drive lock.

FIG. 2 shows a second flow chart illustrating the operation of the drive lock.

FIG. 4 shows a third flow chart illustrating the operation of the drive lock.

DETAILED DESCRIPTION OF THE INVENTION

Figure 1:
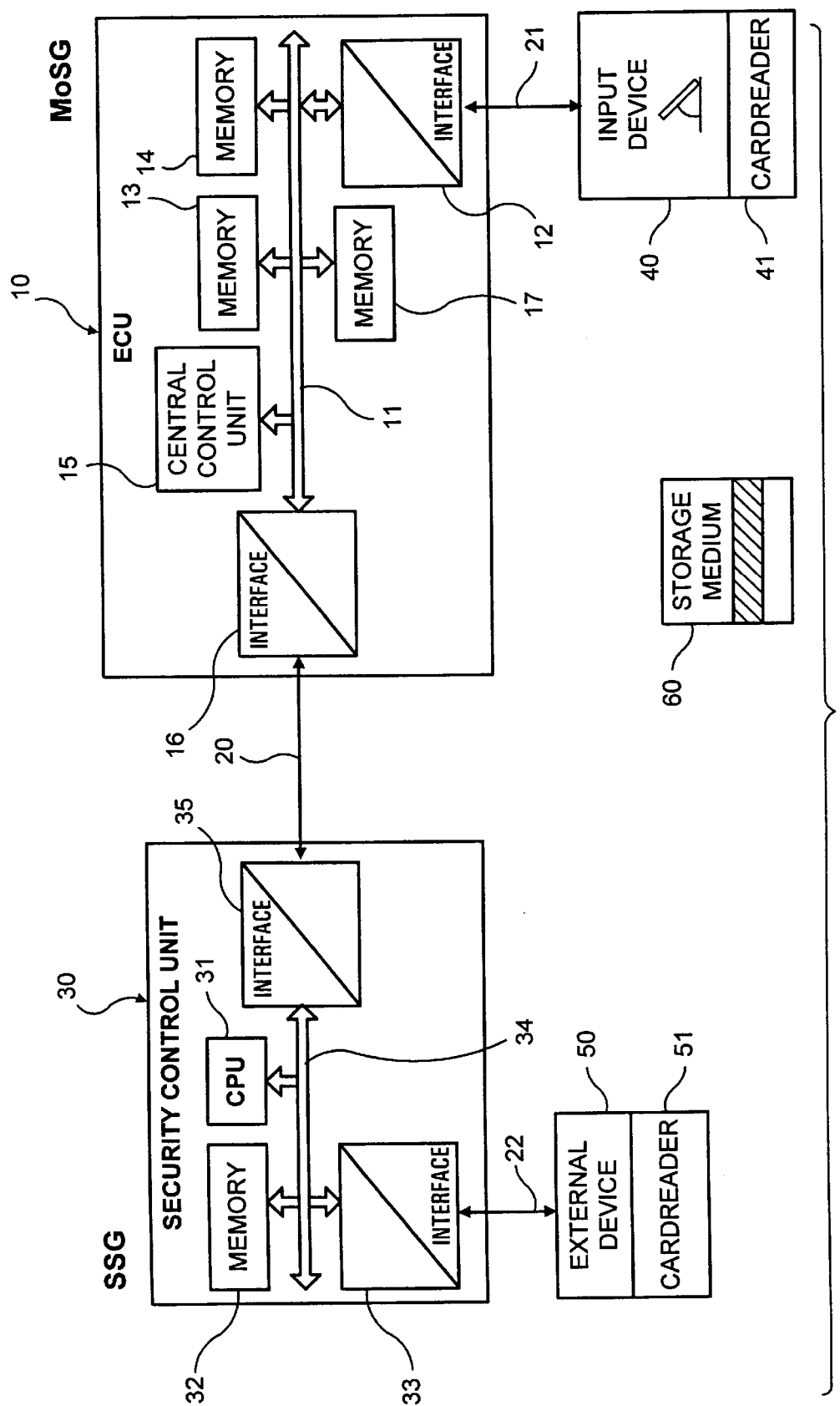
FIG. 1 shows a structural diagram of an exemplary drive lock according to the present invention.

FIG. 1 shows an engine control unit 10 which is connected by a signal line 20 to a security control unit 30. The engine control unit 10 includes a central control unit 15 which is connected via a data bus 11 to first, second and third memory devices 13, 14, 17 and via an interface 16 to signal line 20.

First memory device 13 holds a release V code, which is specific for the respective vehicle. Second memory device 14 holds a user-specific P code, which has been established by an authorized user. Third memory unit 17 holds an M code which is model-specific for the components of a drive lock and serves mainly as a call signal. Data bus 11 also has a second interface 12 to which can be connected an input device 40 over another signal line 21. Engine control unit 10 is advantageously implemented by using a microprocessor or comparable components that process digital signals and are operated by program control. It is further advantageous to provide engine control unit 10 as part of an electronic engine control system which is already provided in most modern vehicles anyway.

Security control unit 30 includes an intelligent central processor unit 31, which is connected to memory devices 32 via a data bus 34, to an interface 35 to data line 20, and to an external interface 33. An external device 50 can be connected to the external interface by a line connection 22. Like engine control unit 10, security control unit 30 is preferably designed using a device that processes digital signals according to a program control, such as a microprocessor in particular, and conventional components from this periphery.

Another component of the drive lock may be an external storage medium 60, wherein the V code, preferably in coded form, is also present. External storage medium 60 may be, for example, a magnetically coded chip card for which a card reader 41 or 51 is provided for the input devices 40 and the external device 50 to read it. Since external storage medium 60 also provides an access authorization code which is to be supplied to input devices 40 with each start-up, such a chip card preferably serves for standard legitimization of a user.

Both engine control unit 10 and security control unit 30 can have additional functionalities, although they are not described herein and therefore have not been shown for reasons of simplicity. The structure of the drive lock illustrated in FIG. 1 is an exemplary embodiment according to the present invention. The drive lock should not be limited to the implementation illustrated in the figures.

Figure 3:
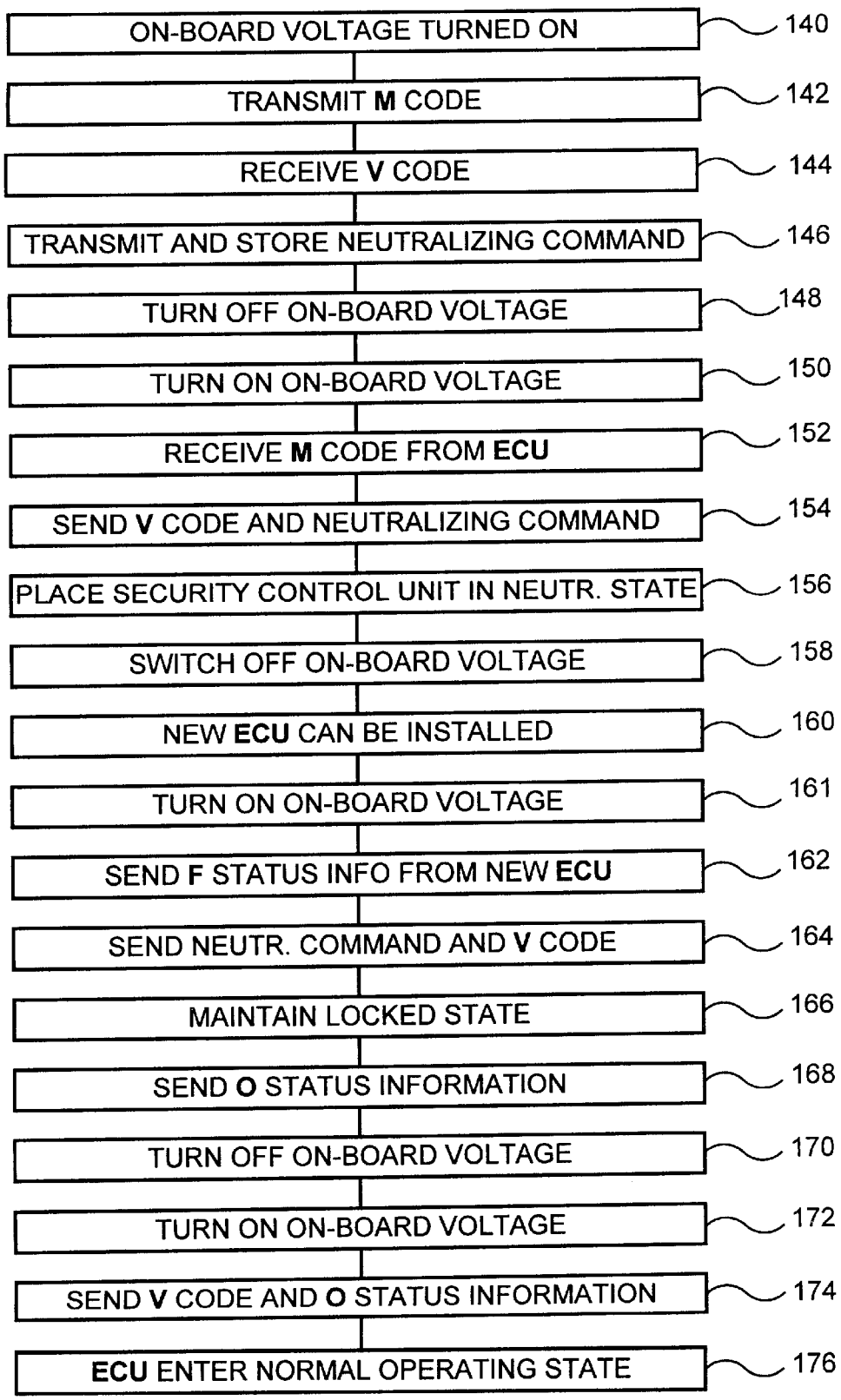

Operation of the drive lock shown in FIG. 1 is explained below with reference to FIGS. 2 through 4. FIG. 2 illustrates a normal operation. To start the vehicle, usually after an access authorization code which legitimizes the user has first been supplied to engine control unit 10 over input devices 40, the on-board voltage is first provided, step 100, generally by turning an ignition key in a known manner. After turning on the on-board voltage system, engine control unit 10 requests a release code from security control unit 30 over data line 20. To do so, engine control unit 10 first sends security control unit 30 an encoded call signal, step 102. This is a code which is referred to here as the M code and is permanently present in the third memory devices 17 of engine control unit 10. According to its essential function as a call signal, the M code must only meet safety requirements that are not as high. It is appropriately created so that it cannot be generated easily with substitute devices. It is preferable to use a uniform M code for all engine control units—as well as for all security control units—of a drive lock model series, so that they are mutually interchangeable with regard to the M code.

Together with the M code, engine control unit 10 transmits mode information to security control unit 30. In normal operation, after the vehicle has already been started regularly at least once, this mode information is a signal which is referred to here as O information. From this signal, security control unit 30 recognizes that a reference code is present in the first memory devices 13 of engine control unit 10 or that a new reference code can be entered into the first memory devices 13.

On receipt of the M code from engine control unit 10, security control unit 30 first records the mode information also transmitted. If it is O information, which designates normal operation, security control unit 30 checks on whether the M code received matches a reference M code present in its memory devices 32, step 104. If this yields a non-match between the M code received and the reference M code present in security control unit 30, security control unit 30 will remain locked, step 108. Engine control unit 10 and security control unit 30 cannot be used together in this case. It is impossible to start the vehicle. However, if the M code and the reference M code match, as in the usual case, security control unit 30 will send to engine control unit 10 a release signal, which is referred to here as a V code and is transmitted in encoded form, as the response signal over data line 20 in reaction to the M code received, step 106. This release signal in the form of a V code essentially implements the security function of the proposed drive lock. Therefore, the V code is vehicle-specific and is not readily accessible from the outside, not even for authorized users. It is stored in memory devices 32 as permanent information that cannot be erased. In addition, it can also be stored in an external storage medium 60.

Then engine control unit 10 compares the received V code with the contents of the first memory devices 13, step 110. A reference code is contained there, if the vehicle has first been started regularly at least once and no manipulations have been performed on drive lock 10, 20, 30. Assuming regular advance starting, the reference code is also a V code. It was predetermined by security control unit 30 when the vehicle was first started regularly. In the case of an authorized start, engine control unit 10 detects a match of the received V code with the reference code present in memory devices 13 and it is then ready for operation, step 112. However, if the comparison of the V code and the reference code yields a non-match, engine control unit 10 remains locked, step 114. Again, it is impossible to start the vehicle. The latter case occurs in particular when one of control units 10, 30 has been replaced by an identical unit. Then the V code present in the replacement unit will necessarily not match the code present in the original unit, because the V code of the partner unit that was replaced is present in the unit that was not replaced.

For the sequence illustrated in FIG. 2, it was assumed that the vehicle has already been started regularly at least once. Under this assumption, there is always a V code as reference code in the first memory devices 13. However, if an engine control unit 10 is being started for the first time, no reference code is yet present in memory devices 14. This situation can occur with brand-new vehicles in particular. In such a case, an engine control unit is started up for the first time according to steps 100 through 108, as illustrated in FIG. 2. In a comparison of the V code received with the contents of the first memory devices 13, step 110, however, engine control unit 10 finds that no reference code is present in memory devices 13. Engine control unit 10 then checks on whether additional information was transmitted together with the V code to control operation of engine control unit 10. If this is not the case, it accepts into the first memory devices 13 the V code transmitted by security control unit 30 as the reference code for all subsequent starts.

For brand-new engine control units 10, whose memory devices 13 do not yet contain any V code, a separate start-up option is preferably provided, which should permit preliminary testing of the device in particular. Under the assumption that no reference code is yet present in the first memory devices 13, a brand-new engine control unit 10 will therefore at its initial start-up send F status information together with the M code call signal to security control unit 30 by means of which it indicates to the latter that it is a brand-new engine control unit 10 whose memory devices 13 do not yet contain a reference code. Security control unit 30 recognizes the F status information and causes security control unit 30 to send a separate release signal back to engine control unit 10 in reaction to the M code received, this release signal being composed of the reference M code present in memory devices 32 plus an auxiliary signal, which is referred to as N status information. In combination with reference code M, this triggers in engine control unit 10 the release of engine control unit 10 without a reference code being deposited in the first memory devices 14. This permits rapid and easy initial operation of an engine control unit 10 for testing purposes without it already being set at a certain V code by testing.

A separate start-up can be accomplished in the same way if both engine control unit 10 and security control unit 30 are brand new. To illustrate the brand-new condition to a user, however, it is preferably modified in this case so that an additional unlocking measure must be performed to unlock the drive lock or release the engine control unit. Such an additional measure to impede unlocking may consist, for example, of the fact that the ignition key is operated in a certain manner repeatedly within a predetermined period of time. In addition, operation of the engine is preferably possible only to a limited extent in the case of separate start-up of a brand-new drive lock with respect to both control units, and operation is limited according to rpm and/or load, for example.

After installation of an engine control unit 10 in a vehicle intended for this purpose, security control unit 30 arranged in the vehicle interprets F status information like O status information indicating normal operation and it also sends a V code back to engine control unit 10 as the release signal on receipt of an M code together with F status information. Depending on the design of the drive lock, means may be provided to induce a reinterpretation of F status information in security control unit 30 by means of a signal which is preset for central processor unit 31 by an external device 50 over external interface 33.

It is also possible to provide that the first time a V code is preset in memory devices 32 of brand-new security control units 30, it is generally done with the help of an external device 50 over a line connection 22 via external interface 33. An external device 50 in this sense may be an engine control unit, for example.

To make it possible for a legitimate user to nevertheless operate the vehicle in the case of an unforeseen technical defect in a component of the drive lock, e.g., in data line 20 or in security control unit 30, an emergency unlock is provided for engine control unit 10. It is based on a P code stored in the second memory devices 13 of engine control unit 10. This is a personal code that is known and is preferably preset by the user. To perform the emergency unlock, an authorized user, i.e., one who has previously entered a correct access authorization code, enters into engine control unit 10 by means of input devices 40 over interface 12 a P code that matches the code deposited in memory devices 13. Suitable input devices 40 for this purpose may be, for example, the gas pedal, which is connected to a fault lamp that flashes periodically. The code is entered by operating the gas pedal in coordination with the number of flashing pulses.

The P code can essentially be changed by an authorized user. In brand-new engine control units 10, a P code, which is usually simple and is disclosed to the user, is preset in the second memory devices 13. The user can replace the preset P code with a code selected by him. This is preferably done in the same way as emergency unlocking, i.e., by operating the gas pedal in a manner to match the number of flashing pulses. Furthermore, the possibility of entering or changing a P code with the help of an external device 50 by means of security control unit 30 may also be provided.

In addition, authorized users are given an opportunity to replace a defective engine control unit 10, for example, by a new engine control unit that functions properly. This is accomplished with the help of an external device 50 connected to security control unit 30 via interface 33. The procedure in this regard is described with reference to FIG. 3. After providing on the on-board voltage, step 140, engine control unit 10 is first released in the usual manner under the assumption that the communication between engine control unit 10 and security control unit 30 is functioning, after first carrying out the following steps: sending an M code, step 142, receiving a V code back from security control unit 30, step 144. Then a neutralizing command is sent to security control unit 30 over external device 50 and stored in memory devices 32, step 146. This is followed by cutting off and then providing again the on-board voltage, steps 148, 150. On renewed receipt of an M code from engine control unit 10 after turning on the on-board voltage again, step 152, security control unit 30 now sends the V code together with the neutralizing command filed in the memory devices back to engine control unit 10, 154. It then puts itself in a neutralized state, step 156, in which it makes the first memory devices 14 ready to receive a new V code, but at the same time locks itself so that it is impossible to start the vehicle. The on-board voltage is then switched off again, step 158. Then a new engine control unit 10 can be installed in step 160. It is started for the first time by providing the on-board voltage again, step 161. If it is brand-new, it first sends F status information designating its brand-new condition together with the M code to security control unit 30, step 162. Security control unit 30 replies by sending the neutralization command present in memory devices 32 of security control unit 30 together with a V code back to engine control unit 10, step 164. It therefore remains in the brand-new or neutralized state and is locked to prevent starting, step 166. At the same time, engine control unit 10 switches into readiness to receive a new V code. Then O information denoting normal operation is sent over external interface 33 to security control unit 30 by means of external device 50, step 168, and deposited in memory devices 32. The neutralizing command present in memory devices 32 is then erased or at least deactivated. Next the on-board voltage is cut off and then provided again, steps 170, 172. Security control unit 30 now reacts to the subsequent sending of an M code again together with F information by the new, neutralized engine control unit 10 by sending back a V code together with the O information in step 174. Engine control unit 10 then goes into the normal operating state in step 176. It accepts the received V code as the future reference code into the first memory devices 14 and releases the engine for operation.

Like engine control unit 10, security control unit 30 can also be replaced, likewise with the help of an external device 50. FIG. 4 illustrates the sequence of performing such a replacement. In this case, the installation of a new security control unit 30 occurs at the beginning, step 180. After providing on the on-board voltage, step 182, engine control unit 10 sends an M code to new security control unit 30, step 184. No V code is yet present in its memory devices 32. It reacts to receipt of the M code by sending back a neutral signal composed of reference M code present in memory devices 32 and passivation instructions, step 186. This causes engine control unit 10 to be locked and not access the reference code present in memory devices 13. Following this, new security control unit 30 receives the valid V code, which is present as the reference code in engine control unit 10, from external device 50 over external interface 33, step 188. The prerequisite for this is that the V code is available outside the vehicle. One possibility for this is to store the V code as digital information on a magnetically coded code card 60. Together with the V code, security control unit 30 receives O status information indicating normal operation. On renewed receipt of an M code by engine control unit 10 after the on-board voltage is turned off and back on again in the meantime, steps 190, 192, 194, security control unit 30 then sends the V code received from the external device back to engine control unit 10 together with the O information in step 196. Engine control unit 10 then puts itself in the normal operating state and releases the engine for operation.

The drive lock described above can be varied within a wide range while retaining the basic concept. In particular, this is the case with the embodiment of the signal processing in the security control unit and the engine control unit. For example, the coded storage of the release signal in the form of the V code may also be done differently than on a magnetic code card.

What is claimed is:

1. A drive lock device, comprising:
    input devices;
    an engine control unit cooperating with the input devices for receiving an access authorization code for verifying a user, the engine control unit being operationally ready when the engine control unit receives the access authorization code; and
    a security control unit coupled to the engine control unit via a signal line,
        wherein the engine control unit includes a first arrangement for delivering a predetermined call signal via the signal line to the security control unit, the predetermined call signal including a predetermined content and serving as a request for the security control unit to transmit a release code,
        wherein the security control unit includes a second arrangement for comparing the predetermined call signal of the engine control unit with a reference signal of the security control unit, the second arrangement providing the release code to the engine control unit if the predetermined content of the predetermined call signal matches a predetermined content of the reference signal, wherein the engine control unit further includes first storage devices for storing the release code received as a reference code, and wherein the engine control unit further includes a testing device for checking whether the reference code is present in the first storage devices when the release code is received, the testing device storing the release code as the reference code in the first storage devices when the reference code is not present in the first storage devices.

2. The drive lock device according to claim 1, wherein the engine control unit is operationally ready when a valid reference code is stored in the first storage devices and when the release code matches the valid reference code.

3. The drive lock device according to claim 1, wherein the testing device provides the predetermined call signal and a status signal indicative of a normal operation when the reference code is present in the storage devices, and wherein the status signal indicates a new condition when the reference code is not present in the first storage devices.

4. The drive lock device according to claim 1, wherein the engine control unit is connected to the input devices via an input signal connection, the input devices being operable by the user for providing a user-specific code.

5. The drive lock device according to claim 1, wherein the security control unit includes third storage devices for storing the release code, and wherein the security control unit includes a central processor unit generating the release code when the predetermined call signal is received, the central processor unit providing the predetermined call signal to the engine control unit.

6. The drive lock device according to claim 5, wherein, after the predetermined call signal is received, the central processor unit sends a neutral signal to the engine control unit, and wherein the neutral signal is not sent if the release code is not present in the third storage devices.

7. The drive lock device according to claim 1, wherein the security control unit includes an interface coupling to an external device, the external device including a further unit transmitting the release code to the security control unit.

8. The drive lock device according to claim 1, wherein the engine control unit includes an interface for coupling to an external device, the external device including a further unit for transmitting a release code to the engine control unit.

9. The drive lock device according to claim 1, wherein, only after the access authorization code has been entered, at least one of the release code and a user-specific code is provided via an external device.

10. The drive lock device according to claim 1, wherein the release signal is a vehicle specific signal.

11. The drive lock device according to claim 1, wherein the predetermined call signal is a product specific signal.

12. A drive lock device, comprising:

input devices;

an engine control unit cooperating with the input devices for receiving an access authorization code for verifying a user, the engine control unit being operationally ready when the engine control unit receives the access authorization code; and a security control unit coupled to the engine control unit via a signal line, wherein the engine control unit includes a first arrangement for delivering a predetermined call signal via the signal line to the security control unit, the predetermined call signal including a request for the security control unit to transmit a release code, wherein the security control unit includes a second arrangement for comparing the predetermined call signal of the engine control unit with a reference signal of the security control unit, the second arrangement providing the release code to the engine control unit if the predetermined call signal matches the reference signal, wherein the engine control unit further includes first storage devices for storing the release code received as a reference code, wherein the engine control unit further includes a testing device for checking whether the reference code is present in the first storage devices when the release code is received, the testing device storing the release code as the reference code in the first storage devices when the reference code is not present in the first storage devices, and wherein the engine control unit includes second storage devices for storing a user-specific code.

13. A drive lock device, comprising:

input devices;

an engine control unit cooperating with the input devices for receiving an access authorization code for verifying a user, the engine control unit being operationally ready when the engine control unit receives the access authorization code; and a security control unit coupled to the engine control unit via a signal line, wherein the engine control unit includes a first arrangement for delivering a predetermined call signal via the signal line to the security control unit, the predetermined call signal including a request for the security control unit to transmit a release code, wherein the security control unit includes a second arrangement for comparing the predetermined call signal of the engine control unit with a reference signal of the security control unit, the second arrangement providing the release code to the engine control unit if the predetermined call signal matches the reference signal, wherein the engine control unit further includes first storage devices for storing the release code received as a reference code, wherein the engine control unit further includes a testing device for checking whether the reference code is present in the first storage devices when the release code is received, the testing device storing the release code as the reference code in the first storage devices when the reference code is not present in the first storage devices, and wherein the engine control unit is coupled to input signal connections and is operationally ready when a user-specific code provided via the input signal connection matches a stored code stored in the first storage devices.

14. A drive lock device, comprising:

input devices;

an engine control unit cooperating with the input devices for receiving an access authorization code for verifying a user, the engine control unit being operationally ready when the engine control unit receives the access authorization code; and a security control unit coupled to the engine control unit via a signal line, wherein the engine control unit includes a first arrangement for delivering a predetermined call signal via the signal line to the security control unit, the predetermined call signal including a request for the security control unit to transmit a release code, wherein the security control unit includes a second arrangement for comparing the predetermined call signal of the engine control unit with a reference signal of the security control unit, the second arrangement providing the release code to the engine control unit if the predetermined call signal matches the reference signal, wherein the engine control unit further includes first storage devices for storing the release code received as a reference code, wherein the engine control unit further includes a testing device for checking whether the reference code is present in the first storage devices when the release code is received, the testing device storing the release code as the reference code in the first storage devices when the reference code is not present in the first storage devices, wherein the security control unit includes third storage devices for storing the release code, wherein the security control unit includes a central processor unit generating the release code when the predetermined call signal is received, the central processor unit providing the predetermined call signal to the engine control unit, and wherein, if the release code is not stored in the third storage devices, and if the predetermined call signal and a status signal indicative of a new condition has been transmitted by the engine control unit, the engine control unit switches into an operationally available state only after performing at least one procedure, the at least one procedure reducing an unlocking potential of the drive lock device.

15. The drive lock device according to claim 14, wherein the at least one procedure includes a repeated operation of an ignition key within a predetermined period of time.

* * * * *